United States Patent
Awan et al.

(10) Patent No.: US 12,222,854 B2
(45) Date of Patent: Feb. 11, 2025

(54) SNAPSHOTTING PENDING MEMORY WRITES USING NON-VOLATILE MEMORY

(71) Applicant: Telefonaktiebolaget LM Ericsson (publ), Stockholm (SE)

(72) Inventors: Ahsan Javed Awan, Vallentuna (SE); Amir Roozbeh, Stockholm (SE); Chakri Padala, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/037,930

(22) PCT Filed: Dec. 22, 2020

(86) PCT No.: PCT/SE2020/051252
§ 371 (c)(1),
(2) Date: May 19, 2023

(87) PCT Pub. No.: WO2022/139637
PCT Pub. Date: Jun. 30, 2022

(65) Prior Publication Data
US 2023/0409472 A1    Dec. 21, 2023

(51) Int. Cl.
*G06F 12/02* (2006.01)
*G06F 12/0882* (2016.01)

(52) U.S. Cl.
CPC ...... *G06F 12/0246* (2013.01); *G06F 12/0882* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 6,594,263 B1 * 7/2003 Martinsson ............. H04J 3/247
                                                370/395.42
7,694,119 B1 * 4/2010 Scharland ............... G06F 3/067
                                                713/1
(Continued)

FOREIGN PATENT DOCUMENTS

EP    1606712 B1    1/2007
EP    3171276 A1    5/2017

OTHER PUBLICATIONS

S. Pontarelli, P. Reviriego and M. Mitzenmacher, "EMOMA: Exact Match in One Memory Access," in IEEE Transactions on Knowledge and Data Engineering, vol. 30, No. 11, pp. 2120-2133, Nov. 1, 2018, doi: 10.1109/TKDE.2018.2818716. (Year: 2018).*
(Continued)

*Primary Examiner* — Daniel C. Chappell
(74) *Attorney, Agent, or Firm* — COATS & BENNETT, PLLC

(57) ABSTRACT

There is provided mechanisms for initiating writing data of a pending memory write on a host computer. A method comprises monitoring pending memory writes for a non-volatile memory write indicator (NVMWI). The NVMWI is either set or not set. The method comprises initiating writing of the data of the pending memory write. Writing of the data is initiated to both a non-volatile memory (NVM) and a volatile memory (VM) when the NVMWI for the pending memory write is set. Writing of the data otherwise is initiated only to the VM.

19 Claims, 6 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 8,719,521 | B1 * | 5/2014 | Barnes | G06F 11/1458 707/639 |
| 9,037,903 | B2 | 5/2015 | Hum et al. | |
| 10,140,212 | B2 | 11/2018 | Subrahmanyam et al. | |
| 2002/0087816 | A1 * | 7/2002 | Atkinson | G06F 12/08 711/158 |
| 2003/0189573 | A1 * | 10/2003 | Dahlen | G06F 13/385 345/522 |
| 2008/0126712 | A1 * | 5/2008 | Mizushima | G06F 12/0246 711/141 |
| 2010/0153620 | A1 * | 6/2010 | Mckean | G06F 11/1466 711/E12.001 |
| 2012/0155160 | A1 | 6/2012 | Alam et al. | |
| 2015/0363223 | A1 * | 12/2015 | Bradbury | G06F 9/3004 719/318 |
| 2016/0117099 | A1 | 4/2016 | Prins et al. | |
| 2016/0188414 | A1 | 6/2016 | Jayakumar et al. | |
| 2016/0379189 | A1 * | 12/2016 | Gschwind | G06Q 20/405 705/39 |
| 2018/0004428 | A1 * | 1/2018 | Seong | G06F 3/0688 |
| 2018/0039439 | A1 | 2/2018 | Suzuki | |
| 2019/0012114 | A1 * | 1/2019 | Spencer | G06F 12/0866 |
| 2019/0187908 | A1 * | 6/2019 | Venkatesan | G06F 12/0253 |
| 2019/0188090 | A1 * | 6/2019 | Mukku | G06F 12/0253 |
| 2020/0133847 | A1 | 4/2020 | Venkatasubramanian et al. | |
| 2020/0167280 | A1 * | 5/2020 | Leitao | G06F 12/0284 |
| 2020/0371946 | A1 * | 11/2020 | Bhoria | G06F 15/8069 |

OTHER PUBLICATIONS

Izumi, T. "Address Range Memory Mirroring", LinuxCon Japan 2016, Jul. 13, 2016, pp. 1-25, Fujitsu Limited.

Hewlett Packard Enterprise, "Memory RAS technologies for HPE ProLiant/Synergy/Blade Gen10 servers with Intel Xeon Scalable processors", Technical white paper, 4AA4-3490ENW, Rev. 4, Jan. 2019, pp. 1-9, Hewlett Packard Enterprise.

Motorola, MPC8260 PowerQUICC IITM Family Reference Manual, May 1, 2003, May 1, 2003, pp. 1-1452.

* cited by examiner

SNAPSHOTTING PENDING MEMORY WRITES USING NON-VOLATILE MEMORY

TECHNICAL FIELD

Embodiments presented herein relate to a method, a host computer, a computer program, and a computer program product for initiating writing data of a pending memory write on the host computer.

BACKGROUND

In some scenarios it is beneficial to save application states so that the application can be resumed when the host computer running the application has recovered from failure, e.g., power failure.

Some applications tend to save their state periodically so that during a power loss or other interruption or corruption of data, the application can be restored from this state without loss of all performed computation. This saved state is referred to as a snapshot.

The use of traditional persistent storage (e.g., hard drives and solid-state drives) for taking the snapshot of the application incurs a penalty in terms of latency and throughput and is limited to the granularity of the memory page sizes. This, in turn, effects the ability of the application to recover from failures with minimum possible down-time.

Non-Volatile Memories (NVMs) have characteristics that make them usable for both dynamic random-access memory (DRAM) and storage-centric applications. However, NVMs have slightly higher latencies and slightly less endurance than DRAMs. NVMs might further be difficult to program so as to be used as persistent storage.

A brief overview of memory handling will now be provided. While fetching application data, processor cores typically use virtual addresses to load and/or store data from memory. As part of the memory allocation for the data, a virtual address is assigned and an unused physical address is selected for the new data location. The virtual address of the data is mapped to the allocated physical address and is kept in an entity called page table by the software. Page tables themselves are stored in memory. When processor cores try to load the data, the processor core looks up the data from the various caches (e.g., layer 1 (L1), layer 2 (L2), and/or layer 3 (L3) caches) followed by a look-up in the memory, if needed. Some of the caches, such as those caches closest to the processor core, use virtual address for look-ups, while other caches and the memory use physical address to retrieve the data. If the cache is associating the data with a virtual address, the processor core can directly load the data. If the data is not found in the cache or if the cache is using the physical address to lookup the data, the processor core has to convert the given virtual address to a physical address. This is done by the processor core traversing the page table, sometimes referred to as page table walking. Since the page table is in the memory and can be large, an address translation cache called Translation Lookaside Buffer (TLB) is kept in the processor core. The TLB keeps recently used addressed as well as entries designated programmatically to be permanently kept in the TLB. The entries in page table and TLB has attributes such as a page being read-only or the page being dirty (i.e., it has been modified).

Some existing techniques that can be used for memory snapshotting with the introduction of NVMs will be presented next.

Memory address-based mirroring explores the idea of mirroring of data across multiple banks of memory using a dynamic addressing technique, for example as disclosed in US 2004/0186945 A1. Data is organized into addressable blocks in the memory banks and the memory address includes a mirror flag. The memory banks are configured in pairs. To write data that need to be mirrored across two memory banks, the processor core issues a write request, asserting a mirror flag that is part of the address. The memory controller detects that the mirror flag is asserted and in response, waits for both memory banks to become available. The memory controller then performs the write to both banks. Memory address-based mirroring is implemented completely in hardware. Memory address-based mirroring is hardcoded, or at least configured, to use the same set of memory banks for mirroring given addresses by virtue of using the same memory controller. While memory address-based mirroring may be good for recovering from memory system failures, it is not a suitable to pair typically low capacity volatile memory (VMs) with typically high capacity NVM to save application states for a power loss scenario.

In software-based mirroring updates to nonvolatile memory pages are mirrored to a remote machine, or other type of computing facility, to achieve fault tolerance and high availability. Mirroring is carried out when the processor core executes a cache flush instruction to flush contents of the cache into the NVM. In addition, mirroring can also be carried out asynchronously with respect to execution of the cache flush instruction by retrieving content that is to be mirrored from the NVM using memory addresses of the NVM corresponding to target memory addresses of the cache flush instruction, as for example disclosed in U.S. Pat. No. 10,140,212 B2. For software-based mirroring a hypervisor traps the NVM flush instruction issued by the application, possibly creating intermediate buffers and copying them to remote buffers. Software is utilized in both the control path (e.g. for setting up pages) as well as in the data path, for detecting, copying, and migrating data. Software-based mirroring is slow and is therefore not suitable for high intensity in-memory cloud applications.

Hence, there is still a need for handling of application states so that the application can be resumed when the host computer running the application has recovered from failure.

SUMMARY

An object of embodiments herein is to provide efficient snapshotting of data of a host application run on a host computer.

According to a first aspect there is presented a method for initiating writing data of a pending memory write on a host computer. The method comprises monitoring pending memory writes for a non-volatile memory write indicator (NVMWI). The NVMWI is either set or not set. The method comprises initiating writing of the data of the pending memory write. Writing of the data is initiated to both an NVM and a VM when the NVMWI for the pending memory write is set. Writing of the data otherwise is initiated only to the VM.

According to a second aspect there is presented a host computer for initiating writing data of a pending memory write. The host computer comprises processing circuitry. The processing circuitry is configured to cause the host computer to monitor pending memory writes for an NVMWI. The NVMWI is either set or not set. The processing circuitry is configured to cause the host computer to initiate writing of the data of the pending memory write. Writing of the data is initiated to both an NVM and a VM when the NVMWI for the pending memory write is set. Writing of the data otherwise is initiated only to the VM.

According to a third aspect there is presented a host computer for initiating writing data of a pending memory write. The host computer comprises a monitor module configured to monitor pending memory writes for an NVMWI. The NVMWI is either set or not set. The host computer comprises an initiate module configured to initiate writing of the data of the pending memory write. Writing of the data is initiated to both an NVM and a VM when the NVMWI for the pending memory write is set. Writing of the data otherwise is initiated only to the VM.

According to a fourth aspect there is presented a computer program for initiating writing data of a pending memory write on a host computer, the computer program comprising computer program code which, when run on the host computer, causes the host computer to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient snapshotting of data of a host application run on the host computer.

Advantageously, these aspects enable dynamic snapshotting of applications without any memory range limitation.

Advantageously, these aspects enable selective snapshotting (e.g., of only critical state information) of applications.

Advantageously, by using NVM as a target for snapshotting, capacity of the VM is not lost.

Advantageously, by being based on monitoring the NVMWI instead of executing a specific cache flushing instruction, these aspects are transparent to the end application running on the host computer.

Advantageously, these aspects remove the need for any boot time configuration and/or reservation and has no requirement to have all memories associated with the same memory controller.

Advantageously, these aspects can be implemented using software only for the control path (during memory allocation) and hardware only for the data path (during memory replication), thereby bringing both flexibility and efficiency.

Advantageously, these aspects are free from software overhead in memory snapshotting the data path.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

As noted above there is still a need for handling of application states so that the application can be resumed when the host computer running the application has recovered from failure.

The embodiments disclosed herein therefore relate to mechanisms for initiating writing data of a pending memory write on a host computer 100. In order to obtain such mechanisms there is provided a host computer 100, a method performed by the host computer 100, a computer program product comprising code, for example in the form of a computer program, that when run on a host computer 100, causes the host computer 100 to perform the method.

Figure 1:
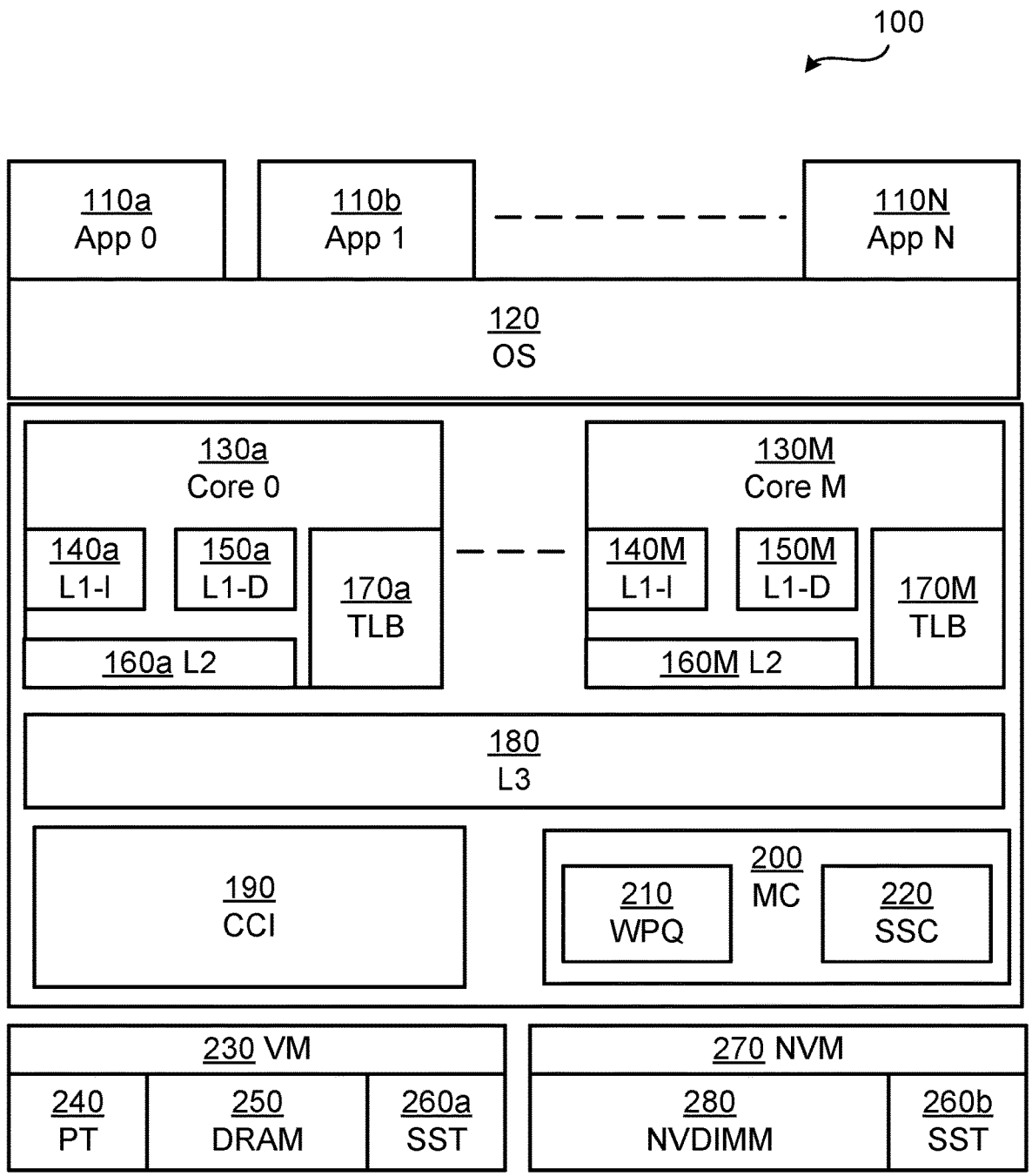
FIG. 1 is a schematic diagram illustrating a host computer according to embodiments.

FIG. 1 is a schematic diagram illustrating a host computer 100 where embodiments presented herein can be applied.

At least one host application 110a, 110b, . . . , 110N, denoted App 0, App 1, . . . , App N, is running on an operating system (OS) 120. Instructions of the at least one host application 110a:110N are executed by at least one processor core 130a:130M 130a, . . . , 130M, denoted Core 0, . . . , Core M. Each at least one processor core 130a:130M implements a Level 1 (L1) cache, optionally divided into an instructions cache (L1-I) 140a, . . . , 140M and a Level 1 data cache (L1-D) 150a, . . . , 150M, a Level 2 (L2) cache 160a, . . . , 160M, and a Translation Lookahead Buffer (TLB) 170a, . . . , 170M. The TLB 170a:170M is a cache that keeps a mapping of virtual to physical memory address. A Level 3 (L3) cache 180 might be shared by all of the at least one processor core 130a:130M. Each entry in the TLB 170a:170M comprises an attribute denoted NVMWI. The mapping of virtual page number to the physical page number is, along with the NVMWI, cached in the TLB 170a:170M from the page table entry. The metadata of each the cache line also comprises the NVMWI. When the virtual page number of a cache line is then looked up in the TLB 170a:170M to get the physical page number, the value of the NVMWI for the physical page number is copied form the TLB 170a:170M into the NVMWI of that cache line.

A cache coherent interconnect (CCI) 190 is operatively connected between the at least one processor core 130a:130M and caches at one side and memory system, in terms of a volatile memory (VM) 230 and a non-volatile memory (NVM) 270 at the other side.

Writing to, and reading from, the storage is controlled by a memory controller (MC) 200. In turn, the MC 200 implements a write pending que (WPQ) 210 and a snapshot cache (SSC) 220. When a cache line is marked as dirty, the physical address of the cache line along with its data is written as an entry to the WPQ 210. Each entry in the WPQ 210 comprises a value of the NVMWI. The value of the NVMWI in the WPQ 210 is updated from the value of the NVMWI of the dirty cache line.

The VM 230 comprises a page table (PT) 240, storage (in term of a DRAM) 250, and a snapshot table (SST) 260a. The SST 260a maintains a mapping between physical pages reserved for snapshot memory on the VM 230 and an NVM 270 as well as the corresponding virtual address. Frequently accessed entries of the SST 260a are buffered in the SSC 220. The NVM 270 comprises a non-volatile dual in-line memory module (NVDIMM) 280, and an SST 260b. The SST 260b in the NVM 270 is a copy of the SST 260a in the VM 230 and is maintained for post restart recovery. Thus, the content of the SST 260b in the NVM 270 is copied from the SST 260a of the VM 230. Each entry in the PT 240 comprises the NVMWI. In the PT 240 the NVMWI is set (in contrast to not being set) for physical page numbers on the VM 230 which have corresponding physical page numbers on the NVM 270, as maintained by the SST 260a.

A snapshot agent is configured to calculate the number of physical memory pages that correspond to the requested snapshot memory size. The snapshot agent is configured to reserve the pages on both the VM 230 and the NVM 270 and to populate the PT 240 and the SST 260a. A physical page reserved on the VM 230 for the snapshot memory would have a corresponding physical page on the NVM 270. Functionality of the snapshot agent is implemented partly by the OS 120 and partly by the MC 200.

The snapshot agent is configured to inspect the NVMWI of the physical address in the WPQ 210. The snapshot agent is configured to, when the NVMWI is set, extract the physical page number from the physical address, look up that page number in the SST 260a, obtain the corresponding page number on the NVM 270, and calculate or obtain the physical address on the NVM 270. The snapshot agent is further configured to send that physical address on the NVM 270 and data corresponding to the physical address in the WPQ 210 to the MC 200, which then writes the data to the NVM 270. If the target NVM 270 is attached to a different MC 200, the data is sent to that MC 200.

Figure 2:
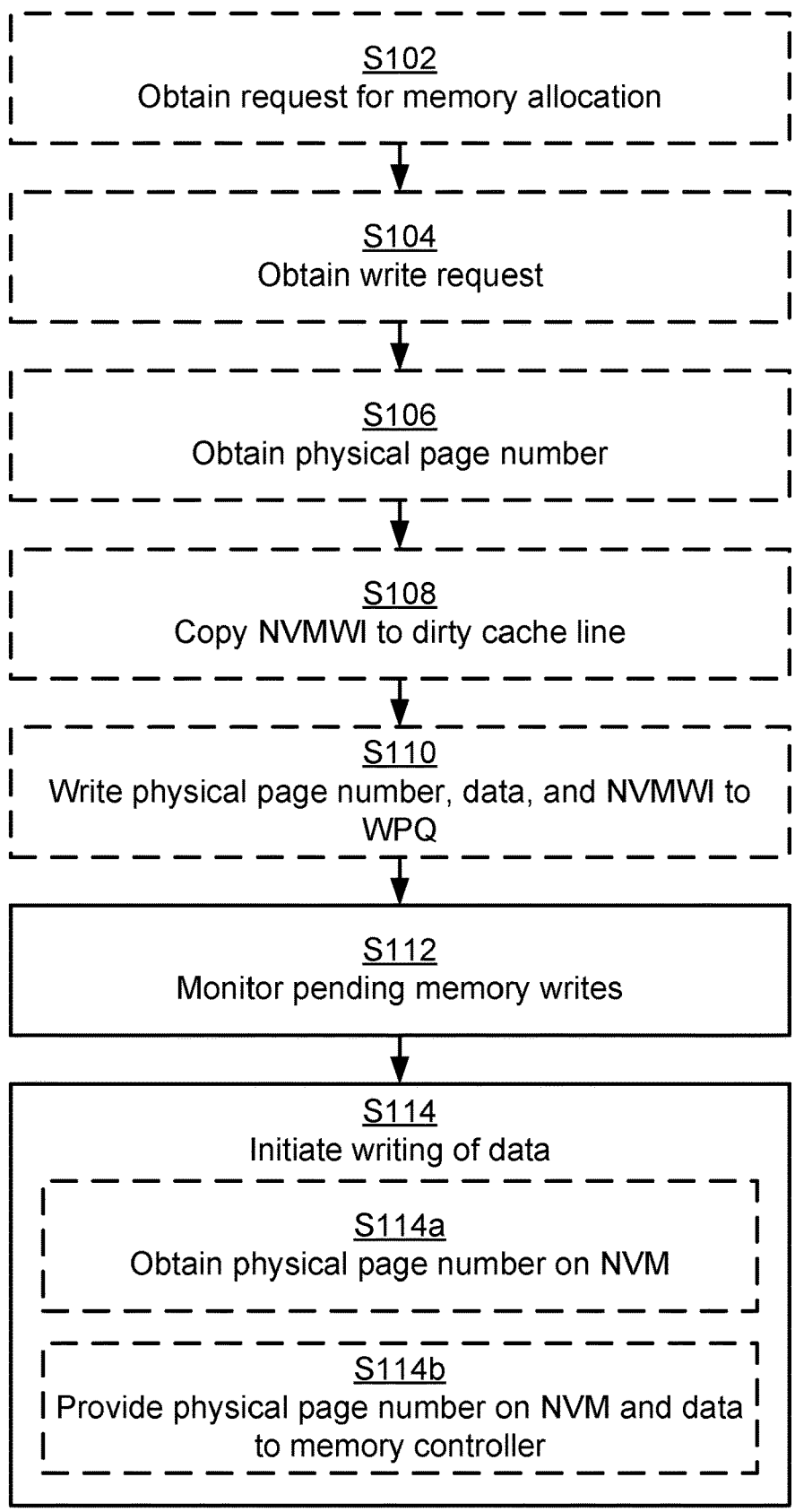
FIG. 2 is a flowchart of methods according to embodiments.

FIG. 2 is a flowchart illustrating embodiments of methods for initiating writing data of a pending memory write on a host computer 100. The methods are performed by the host computer 100. The methods are advantageously provided as computer programs 920. The method might at least partly be performed by the snapshot agent executed on the host computer 100.

S112: Pending memory writes are monitored for an NVMWI. The NVMWI is either set or not set.

S114: Writing of the data of the pending memory write is initiated. Writing of the data is initiated to both the NVM 270 and the VM 230 when the NVMWI for the pending memory write is set. Writing of the data otherwise is initiated only to the VM 230. Embodiments relating to further details of initiating writing data of a pending memory write on a host computer 100 as performed by the host computer 100 will now be disclosed.

There may be different ways in which the pending memory writes are monitored for the NVMWI. In some aspects, the dirty cache lines in the WPQ 210 are monitored. In particular, in some embodiments, the pending memory writes are defined by dirty cache lines populating the WPQ 210. There could be different types of entries in the WPQ 210. In some embodiments, the WPQ 210, for each of the dirty cache lines, is populated with data, a physical page number, and an NVMWI field. The WPQ 210, per dirty cache line, is then monitored for the NVMWI in the NVMWI field.

There may be different reasons as to why the pending memory writes are monitored for the NVMWI. In some aspects, the monitoring is the result of a host application 110a:110N requesting memory allocation. Hence, in some embodiments, optional action S102 is performed:

S102: A request for memory allocation for the data to be written is obtained from a host application 110a:110N executed on the host computer 100. A virtual address space is then provided for the host application 110a:110N.

The number of physical page numbers corresponding to the size of the requested memory allocation can then be determined, and pages be reserved on both the VM 230 and the NVM 270. That is, in some embodiments, as many physical pages as required for the memory allocation are reserved on both the VM 230 and the NVM 270.

In some aspects, the SST 260a maintains a mapping between the physical pages reserved for the snapshot memory on the VM 230 and the NVM 270 as well as virtual addresses. In particular, in some embodiments, a first mapping is kept between the physical page numbers reserved on the VM 230 and the NVM 270 and virtual addresses in the virtual address space for each of the physical page numbers. The first mapping might be kept in the SST 260a.

In some aspects, a copy of the SST 260a is maintained in the NVM 270. That is, in some embodiments, the first mapping is kept in the VM 230 and a copy of the mapping is kept in (the SST 260b in) the NVM 270.

In some embodiments, the NVMWI is set for all physical page numbers on the VM 230 that (according to the first mapping) have corresponding physical page numbers on the NVM 270.

Further, the TLB 170a:170M might keep a mapping (as obtained from the PT 240 entry) between the virtual page numbers, the physical page numbers and the NVMWI. That is, in some embodiments, a second mapping is in a processor core 130a:130M kept between the physical page numbers reserved on the VM 230 and virtual page numbers and the NVMWI for each of the physical page numbers reserved on the VM 230. The NVMWI is set for each of the physical page numbers reserved on the VM 230 that has a corresponding page number reserved on the NVM 270. The second mapping might be kept in the TLB 170a:170M.

When the processor core 130a:130M issues a write request with a virtual address, the virtual page number of the cache line is looked up in the TLB 170a:170M to get the physical page number, and the NVMWI of the physical page number is copied from the TLB 170a:170M to the cache line as part of marking the cache line dirty. Hence, in some embodiments, the method further comprises (optional) actions S104, S106, S108:

S104: A write request for one of the virtual addresses is obtained.

Action S106 and action S108 are performed in response to the write request having been obtained.

S106: The physical page number on the VM 230 for the virtual page number of this one of the virtual addresses is obtained from the second mapping.

S108: The NVMWI for the obtained physical page number is copied to the dirty cache line so as to set the NVMWI for the pending memory write.

For a dirty cache line, the physical address and the data, as well as the NVMWI for the physical address and the data, is written to the WPQ 210. Hence, in some embodiments, the method further comprises (optional) action S110:

S110: The obtained physical page number, the data, and the NVMWI for the obtained physical page number are written to the WPQ 210.

As disclosed above, the SSC 220 might buffer frequently accessed entries in the SST 260a. In particular, in some embodiments, a subset of the first mapping is in the MC 200 of the NVM 270 kept for those of the physical page numbers reserved on the VM 230 and the NVM 270 and virtual addresses in the virtual address space for each of the physical page numbers that are most frequently accessed. The subset might be kept in the SSC 220.

In some aspects, the physical page number is extracted from the physical address for which the NVMWI is set, the page number is looked up in the SST 260a, the corresponding page number on the NVM 270 is obtained, and the physical address on the NVM 270 is calculated. Hence, in some embodiments, the method comprises (optional) action S114a as part of initiating writing of the data in action S114:

S114a: The physical page number on the NVM 270 corresponding to the obtained physical page number is obtained from the subset of the first mapping in the MC 200 or the first mapping in the VM 230.

In some aspects, the physical address on the NVM 270 and data corresponding to the physical address in the WPQ 210 is sent to the MC 200 (which then writes the data to the NVM 270). Hence, in some embodiments, the method comprises (optional) action Sub as part of initiating writing of the data in action S114 when the NVMWI for the pending memory write is set:

S114b: The physical page number on the NVM 270 and the data is provided to the MC 200.

Figure 3:
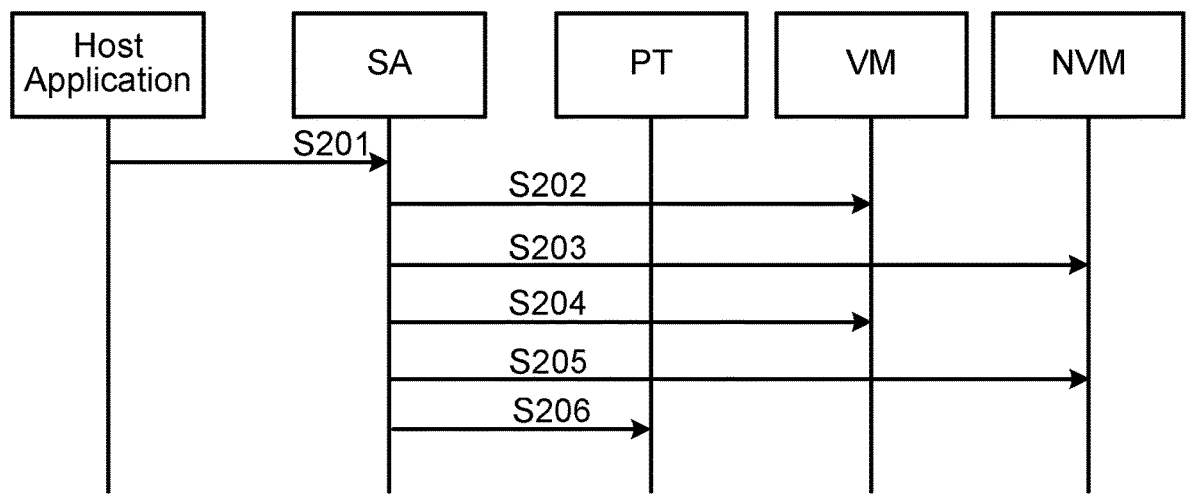
FIGS. 3, 4, 5 are signalling diagrams of methods according to embodiments.

Reference is now made to the signalling diagram of FIG. 3 illustrating an embodiment of memory creation in the host computer.

Action S201: The host application 110a:110N initiates snapshot memory allocation to be performed by the snapshot agent.

Action S202: The snapshot agent allocates memory in the VM 230 and corresponding address(es) are found.

Action S203: The snapshot agent allocates memory in the NVM 270 and corresponding memory address(es) are found.

Action S204: The snapshot agent updates the SST 260a in the VM 230.

Action S205: The snapshot agent updates the SST 260b in the NVM 270.

Action S206: The snapshot agent creates page table entries with the NVMWI being set.

Figure 4:
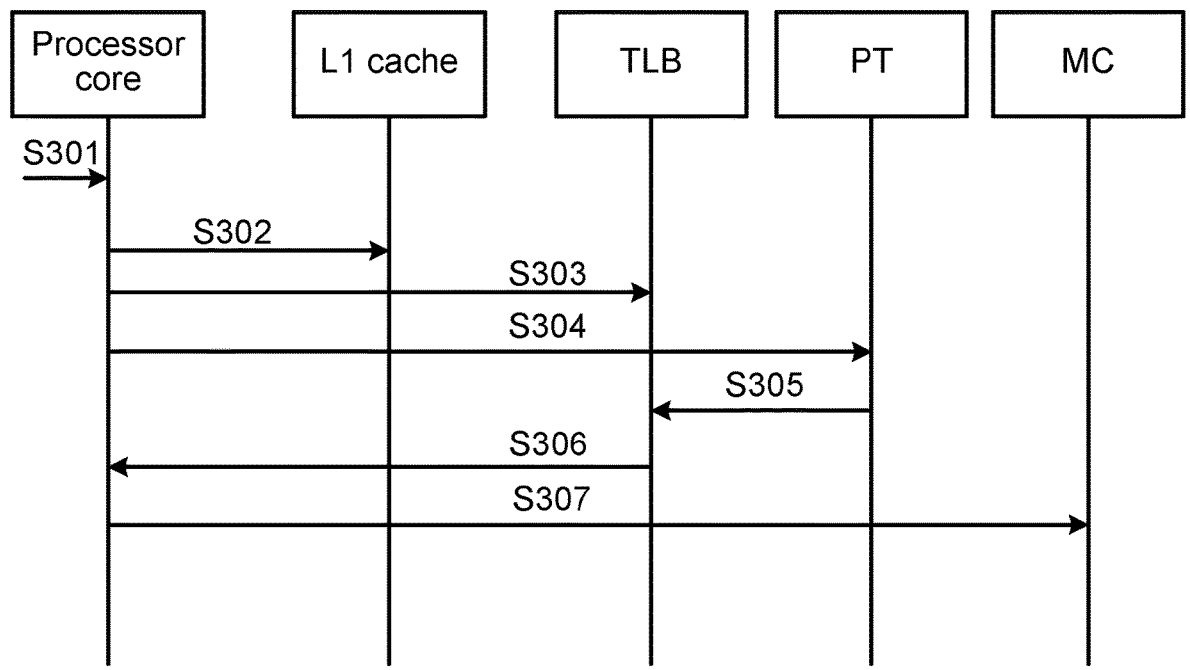

Reference is now made to the signalling diagram of FIG. 4 illustrating an embodiment of handling a write request received from the processor core 130a:130M.

Action S301: A write request is created by the host application 110a:110N with data and the intended virtual address. The write request is provided to the processor core 130a:130M in the host computer.

Action S302: The processor core 130a:130M initiates a search in the L1 cache for the matching data using the virtual address.

Action S303: The processor core 130a:130M initiates a TLB 170a:170M entry lookup for the virtual address.

Action S303 might be performed in parallel with action S302 or if action S302 is not successful (i.e., if the matching data is not found in the L1 cache). If action S303 is not successful (i.e., the virtual address is not found in the TLB 170a:170M), actions S304-S306 are performed.

Action S304: The processor core 130a:130M initiates a search in the PT 240 for an entry with matching virtual address.

Action S305: A TLB 170a:170M entry is created in the TLB 170a:170M and the NVMWI is copied from the PT 240 entry.

Action S306: The TLB 170a:170M returns the address entry with the corresponding NVMWI to the processor core 130a:130M.

Action S307: The processor core 130a:130M sends the data and the NVMWI to the MC 200.

This process could end up creating appropriate entries for the L1 cache, the L2 cache, and/or the L3 cache. Alternatively, these entries could have been created by a prior read request of the data by the host application 110a:110N.

Figure 5:
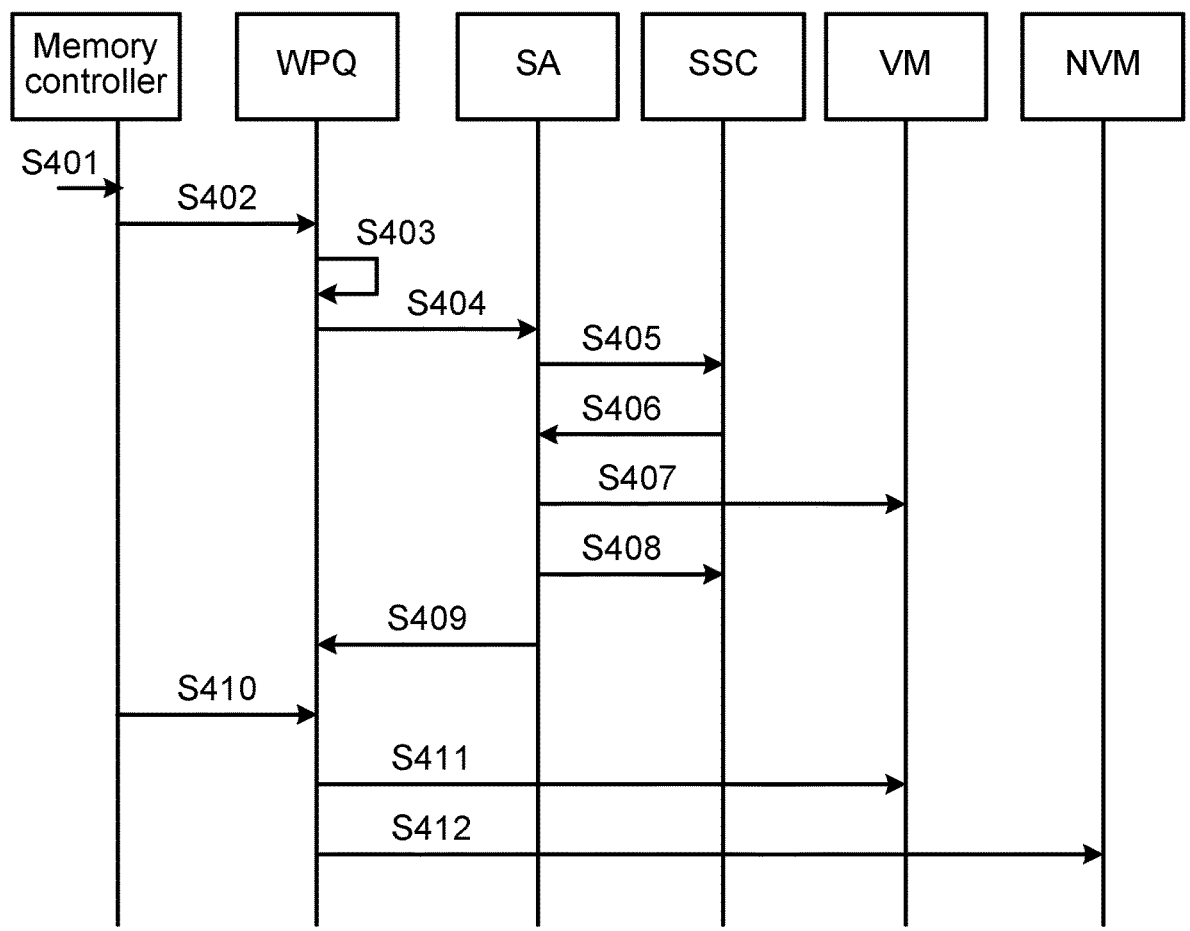

Reference is now made to the signalling diagram of FIG. 5 illustrating an embodiment of handling a received write request in the host computer.

Action S401: The MC 200 receives an incoming write request.

Action S402: The MC 200 initiates storing of the write request in the WPQ 210.

Action S403: In the WPQ 210 is checked whether or not the NVMWI is set for the write request.

Action S404: If the NVMWI is set, a request is sent to the snapshot agent for obtaining the NVM address to write to.

Action S405: The snapshot agent initiates a look-up of the address in the SSC 220 for a base address of the matching entry.

Action S406: If the NVM address is found the address is returned from the SSC 220 to the snapshot agent. If the NVM address is not found a failure is indicated from the SSC 220 to the snapshot agent.

Action S407: If the NVM address is not found in the SSC 220, the snapshot agent initiates a look-up of the address in the VM 230.

Action S408: The snapshot agent initiates an updated of the SSC 220 to remove an entry if the SSC 220 is full.

Action S409: The address returned from the VM 230 or the SSC 220 is the base address for the page and the base address is returned from the snapshot agent to the WPQ 210. A corresponding address for the cacheline in the WPQ 210 is calculated and updated. If the NVM address corresponds to a different MC 200, the WPQ 210 is cloned and a request is sent to the appropriate MC 200 without the NVMWI. The latter is not shown in FIG. 5

Action S410: The MC 200 initiates a flush request to the WPQ 210. This could be due to a user or OS invoked flush or be a timer based or be due to other reasons.

Actions S411, S412: The WPQ 210 uses the returned address(es) and sends the write request to the VM 230 and the NVM 270.

Figure 6:
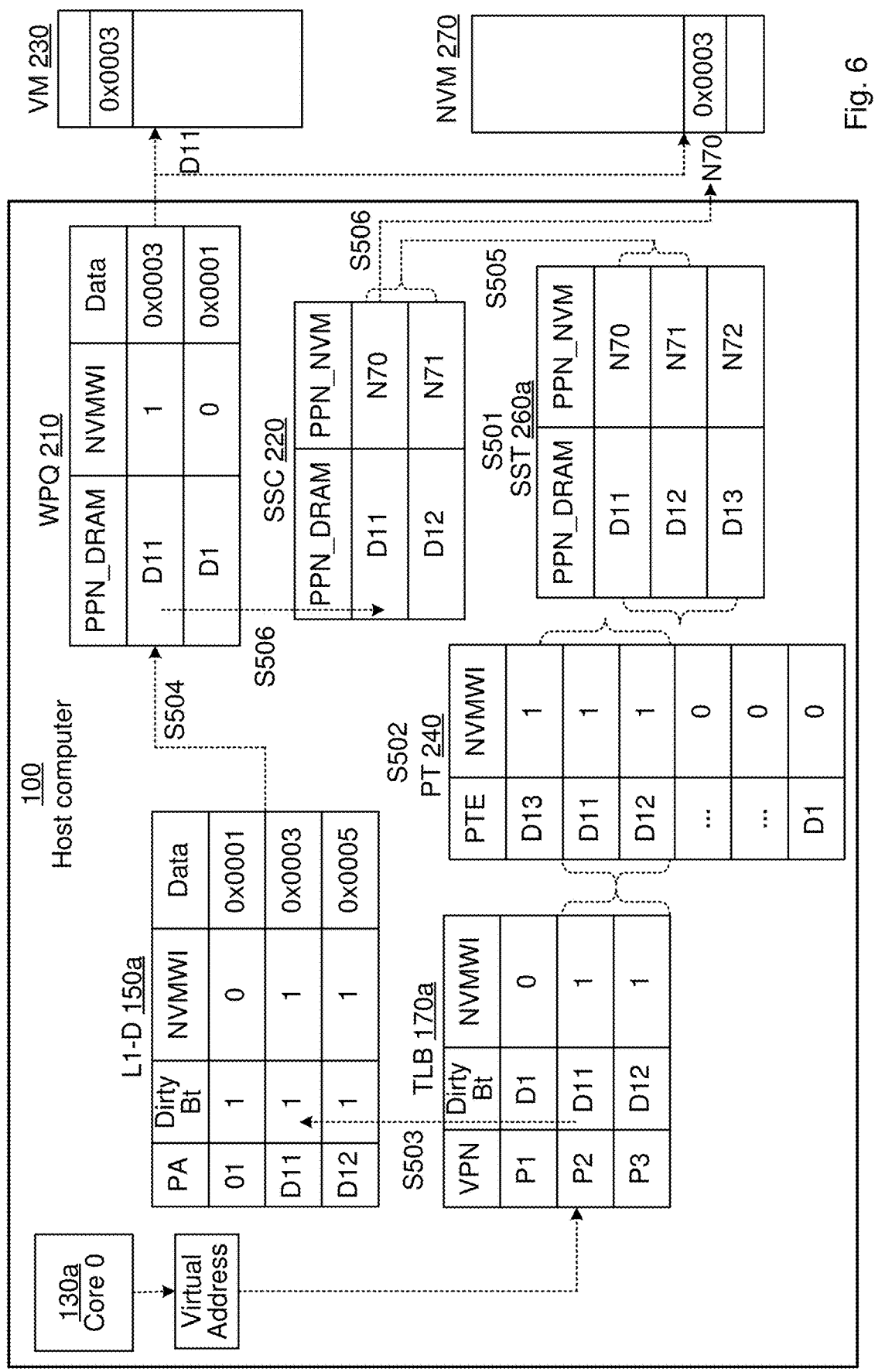
FIG. 6 schematically illustrates a host computer according to an embodiment.

An example embodiment of a method for initiating writing data of a pending memory write on a host computer 100 will now be disclosed with reference to FIG. 6. FIG. 6 schematically illustrates a host computer 100 comprising a processor core 130a, an L1 cache, a TLB 170a, a PT 240, a WPQ 210, an SSC 220, an SST 260*a*, a VM 230, and an NVM 270. The write request can also be initiated at a lower level cache (L2 cache and/or L3 cache) when the cache line is dirty and evicted.

Action S501: Instructions of a host application 110*a*:110N run on the OS 120 and executed by a processor core 130*a* that requests the OS 120 for the allocation of snapshot-able memory is provided. The snapshot agent calculates the number of physical memory pages (3) that correspond to the requested snapshot memory size. The snapshot agent reserves pages on both the VM 230 (D11, D12 and D13) and the NVM 270 (N70, N71 and N72) and populate the PT 240 and the SST 260*a*. A physical page reserved on the VM 230 (D11) for the snapshot memory has a corresponding physical page (N70) on the NVM 270.

Action S502: The NVMWI in the entry of the PT 240 is set for the physical page numbers on VM 230 (D11, D12 and D13) which have corresponding physical page numbers on the NVM 270 (as maintained by the SST 260*a*).

Action S503: When the processor core 130*a* issues the write request with a virtual address, the virtual page number (P2) is looked-up in the TLB 170*a* to get the physical page number (D11). The physical page number (D11), along its associated value of the NVMWI (1), is propagated to the cache. The cache line corresponding to the physical page number (D11) is marked as dirty.

Action S504: The cache lines marked dirty (e.g. D11, 1, 0x0003) are written back to the WPQ 210 in the MC 200. The WPQ 210 also maintains the value (1) of the NVMWI besides the physical address (D11) and the data (0x0003).

Action S505: The SSC 220 buffers frequently accessed entries of the SST 260*a* (e.g. D11, N70).

Action S506: The snapshot agent inspects the NVMWI (1) of the physical address in the WPQ 210. The snapshot agent extracts the physical page number (D11) from the physical address, performs a look-up of that page number in the SSC 220, obtains the corresponding page number (N70) on the NVM 270, and calculates the physical address on the NVM 270. The snapshot agent sends that physical address on the NVM 270 and data (0x0003) corresponding to the physical address in the WPQ 210 to the MC 200, which then writes the data to the NVM 270. If the target NVM 270 is attached to a different MC 200, the data is sent to that MC 200.

Figure 7:
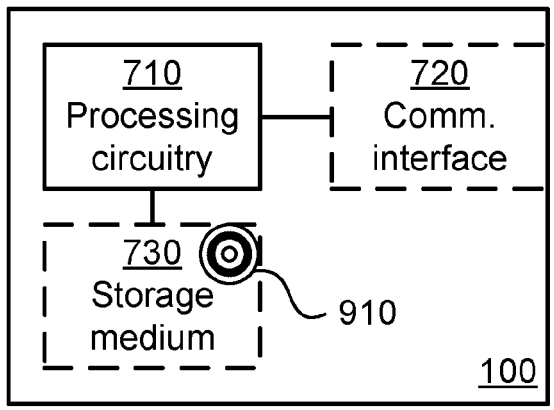
FIG. 7 is a schematic diagram showing functional units of a host computer according to an embodiment.

FIG. 7 schematically illustrates, in terms of a number of functional units, the components of a host computer 100 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 730. The processing circuitry 710 may further be provided as at least one application specific integrated circuit (ASIC), or field programmable gate array (FPGA).

Particularly, the processing circuitry 710 is configured to cause the host computer 100 to perform a set of operations, or actions, as disclosed above. For example, the storage medium 730 may store the set of operations, and the processing circuitry 710 may be configured to retrieve the set of operations from the storage medium 730 to cause the host computer 100 to perform the set of operations. The set of operations may be provided as a set of executable instructions.

Thus the processing circuitry 710 is thereby arranged to execute methods as herein disclosed. The storage medium 730 may also comprise persistent storage, which, for example, can be any single one or combination of magnetic memory, optical memory, solid state memory or even remotely mounted memory. The host computer 100 may further comprise a communications interface 720 at least configured for communications with other entities, functions, nodes, and devices. As such the communications interface 720 may comprise one or more transmitters and receivers, comprising analogue and digital components. The processing circuitry 710 controls the general operation of the host computer 100 e.g. by sending data and control signals to the communications interface 720 and the storage medium 730, by receiving data and reports from the communications interface 720, and by retrieving data and instructions from the storage medium 730. Other components, as well as the related functionality, of the host computer 100 are omitted in order not to obscure the concepts presented herein.

Figure 8:
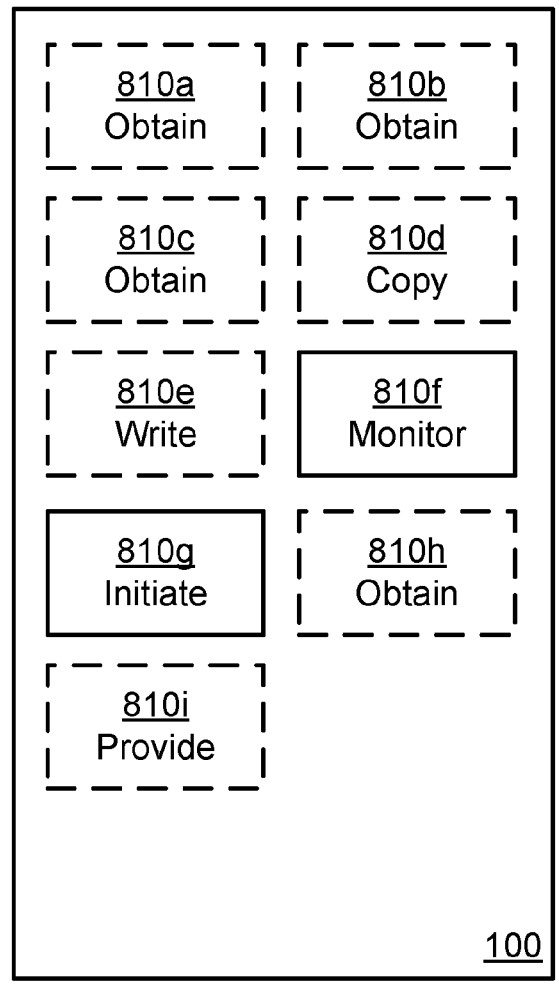
FIG. 8 is a schematic diagram showing functional modules of a host computer according to an embodiment.

FIG. 8 schematically illustrates, in terms of a number of functional modules, the components of a host computer 100 according to an embodiment. The host computer 100 of FIG. 8 comprises a number of functional modules; a monitor module 810*f* configured to perform action S112, and an initiate module 810*g* configured to perform action S114. The host computer 100 of FIG. 8 may further comprise a number of optional functional modules, such as any of a first obtain module 810*a* configured to perform action S102, a second obtain module 810*b* configured to perform action S104, a third obtain module 810*c* configured to perform action S106, a copy module 810*d* configured to perform action S108, a write module 810*e* configured to perform action S110, a fourth obtain 810*h* module configured to perform action S114*a*, and a provide module 810*i* configured to perform action S114*b*.

In general terms, each functional module 810*a*:810*i* may in one embodiment be implemented only in hardware and in another embodiment with the help of software, i.e., the latter embodiment having computer program instructions stored on the storage medium 730 which when run on the processing circuitry makes the host computer 100 perform the corresponding actions mentioned above in conjunction with FIG. 8. It should also be mentioned that even though the modules correspond to parts of a computer program, they do not need to be separate modules therein, but the way in which they are implemented in software is dependent on the programming language used. Preferably, one or more or all functional modules 810*a*:810*i* may be implemented by the processing circuitry 710, possibly in cooperation with the communications interface 720 and/or the storage medium 730. The processing circuitry 710 may thus be configured to from the storage medium 730 fetch instructions as provided by a functional module 810*a*:810*i* and to execute these instructions, thereby performing any actions as disclosed herein.

The host computer 100 may be provided as a standalone device or as a part of at least one further device. Alternatively, functionality of the host computer 100 may be distributed between at least two devices, or nodes. Thus, a first portion of the instructions performed by the host computer 100 may be executed in a first device, and a second portion of the of the instructions performed by the host computer 100 may be executed in a second device; the herein disclosed embodiments are not limited to any particular number of devices on which the instructions performed by the host computer 100 may be executed. Hence, the methods according to the herein disclosed embodiments are suitable to be performed by a host computer 100 residing in a cloud computational environment. Therefore, although a single processing circuitry 710 is illustrated in FIG. 7 the processing circuitry 710 may be distributed among a plurality of devices, or nodes. The same applies to the functional modules 810a:810i of FIG. 8 and the computer program 920 of FIG. 9.

Figure 9:
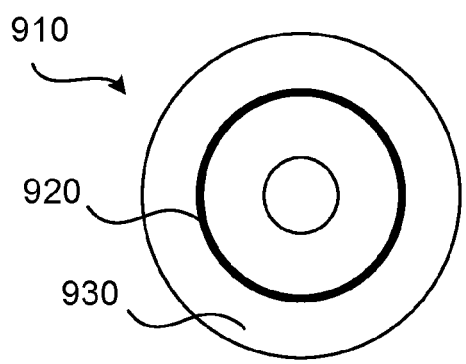
FIG. 9 shows one example of a computer program product comprising computer readable storage medium according to an embodiment.

FIG. 9 shows one example of a computer program product 910 comprising computer readable storage medium 930. On this computer readable storage medium 930, a computer program 920 can be stored, which computer program 920 can cause the processing circuitry 710 and thereto operatively coupled entities and devices, such as the communications interface 720 and the storage medium 730, to execute methods according to embodiments described herein. The computer program 920 and/or computer program product 910 may thus provide means for performing any actions as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method of managing data writes from memory of a host computer, the method comprising:
    monitoring pending memory writes for a non-volatile memory write indicator (NVMWI), wherein the NVMWI is either set or not set;
    initiating writing, to both a non-volatile memory (NVM) and a volatile memory (VM), data of each of the pending memory writes for which the NVMWI is set; and
    initiating writing, only to the VM, data of each of the pending memory writes for which the NVMWI is not set;
    wherein a second mapping is kept in a processor core, the second mapping being between:
        physical page numbers reserved on the VM; and
        virtual page numbers; and
        the NVMWI for each of the physical page numbers reserved on the VM; and
    wherein the NVMWI is set for each of the physical page numbers reserved on the VM that has a corresponding page number reserved on the NVM.

2. The method of claim 1, wherein the pending memory writes are defined by dirty cache lines populating a write pending queue (WPQ).

3. The method of claim 2, wherein the WPQ:
    for each of the dirty cache lines, is populated with data, a physical page number, and an NVMWI field; and
    per dirty cache line, is monitored for the NVMWI in the NVMWI field.

4. The method of claim 1, further comprising obtaining, from a host application executed on the host computer, a request for memory allocation for the data to be written, wherein a virtual address space is provided for the host application.

5. The method of claim 4, wherein as many physical pages as required for the memory allocation are reserved on both the VM and the NVM.

6. The method of claim 5, wherein a first mapping is kept, the first mapping being between:
    the physical page numbers reserved on the VM for the memory allocation; and
    the physical page numbers reserved on the NVM for the memory allocation; and
    for each of the physical page numbers reserved on the VM, a corresponding virtual address in the virtual address space.

7. The method of claim 6, wherein:
    the first mapping is kept in the VM and a copy of the first mapping is kept in the NVM; or
    the first mapping is kept in a snapshot table; or
    the first mapping is kept in the snapshot table and in the VM and the copy of the first mapping is kept in the NVM.

8. The method of claim 6, wherein the NVMWI is set for all physical page numbers on the VM which, of the first mapping, have corresponding physical page numbers on the NVM.

9. The method of claim 6, wherein a subset of the first mapping is in a memory controller of the NVM kept for those of the physical page numbers reserved on the VM and the NVM and virtual addresses in the virtual address space for each of the physical page numbers that are most frequently accessed.

10. The method of claim 9, wherein:
    the subset is kept in a snapshot cache; or
    initiating writing of the data further comprises obtaining, from the subset of the first mapping in the memory controller or the first mapping in the VM, the physical page number on the NVM corresponding to the obtained physical page number; or
    the subset is kept in a snapshot cache and initiating writing of the data further comprises obtaining, from the subset of the first mapping in the memory controller or the first mapping in the VM, the physical page number on the NVM corresponding to the obtained physical page number.

11. The method of claim 10, wherein, when the NVMWI for the pending memory write is set, initiating writing of the data further comprises providing the physical page number on the NVM and the data to the memory controller.

12. The method of claim 1, wherein the second mapping is kept in a translation lookahead buffer.

13. The method of claim 1, wherein:
    the pending memory writes are defined by dirty cache lines populating a WPQ;
    the method further comprises obtaining a write request for one of the virtual addresses, and in response:
        obtaining the physical page number on the VM for the virtual page number of said one of the virtual addresses from the second mapping; and
        copying the NVMWI for the obtained physical page number to the dirty cache line so as to set the NVMWI for the pending memory write.

14. A host computer adapted to manage data writes from memory, wherein the host computer comprises:
  processing circuitry and the memory, wherein the processing circuitry is configured to:
    monitor pending memory writes for a non-volatile memory write indicator (NVMWI), wherein the NVMWI is either set or not set;
    initiate writing, to both a non-volatile memory (NVM) and a volatile memory (VM), data of each of the pending memory writes for which the NVMWI is set; and
    initiate writing, only to the VM, data of each of the pending memory writes for which the NVMWI is not set;
  wherein a second mapping is kept in a processor core, the second mapping being between:
    physical page numbers reserved on the VM; and
    virtual page numbers; and
    the NVMWI for each of the physical page numbers reserved on the VM; and
  wherein the NVMWI is set for each of the physical page numbers reserved on the VM that has a corresponding page number reserved on the NVM.

15. The host computer of claim 14, wherein the pending memory writes are defined by dirty cache lines populating a write pending queue (WPQ).

16. The host computer of claim 15, wherein the WPQ:
  for each of the dirty cache lines, is populated with data, a physical page number, and an NVMWI field; and
  per dirty cache line, is monitored for the NVMWI in the NVMWI field.

17. The host computer of claim 14, further comprising obtaining, from a host application executed on the host computer, a request for memory allocation for the data to be written, wherein a virtual address space is provided for the host application.

18. The host computer of claim 17, wherein as many physical pages as required for the memory allocation are reserved on both the VM and the NVM.

19. A non-transitory computer readable medium storing a computer program product for controlling a host computer, the computer program product comprising software instructions that, when run on processing circuitry of the host computer, cause the host computer to:
  monitor pending memory writes for a non-volatile memory write indicator (NVMWI), wherein the NVMWI is either set or not set; and
  initiate writing, to both a non-volatile memory (NVM) and a volatile memory (VM), data of each of the pending memory writes for which the NVMWI is set; and
  initiate writing, only to the VM, data of each of the pending memory writes for which the NVMWI is not set;
  wherein a second mapping is kept in a processor core, the second mapping being between:
    physical page numbers reserved on the VM; and
    virtual page numbers; and
    the NVMWI for each of the physical page numbers reserved on the VM; and
  wherein the NVMWI is set for each of the physical page numbers reserved on the VM that has a corresponding page number reserved on the NVM.

* * * * *